US006785132B1

(12) United States Patent
Medin et al.

(10) Patent No.: US 6,785,132 B1
(45) Date of Patent: Aug. 31, 2004

(54) METHOD AND SYSTEM FOR PROVIDING FLASH MEMORY IN AN INDUSTRIAL PERSONAL COMPUTER

(75) Inventors: David T. Medin, Marion, IA (US); Todd A. Hermanson, Cedar Rapids, IA (US); Scott L. Kayser, Cedar Rapids, IA (US)

(73) Assignee: Crystal Group Inc., Hiawatha, IA (US)

( * ) Notice: Subject to any disclaimer, the term of this patent is extended or adjusted under 35 U.S.C. 154(b) by 808 days.

(21) Appl. No.: 09/589,434

(22) Filed: Jun. 7, 2000

(51) Int. Cl.[7] .................................................. G06F 1/16
(52) U.S. Cl. ...................................... 361/686; 361/683
(58) Field of Search ........................ 361/683; 339/64 R, 339/186 R

(56) References Cited

U.S. PATENT DOCUMENTS

| | | | | |
|---|---|---|---|---|
| 3,755,771 A | * | 8/1973 | Brush ........................ | 339/64 R |
| 5,694,291 A | * | 12/1997 | Feightner .................... | 361/683 |
| 6,147,863 A | * | 11/2000 | Moore et al. ............... | 361/686 |

* cited by examiner

*Primary Examiner*—Yean-Hsi Chang
(74) *Attorney, Agent, or Firm*—Simmons, Perrine, Albright & Ellwood, PLC

(57) ABSTRACT

A system and method for providing non-volatile memory to a PC which includes a compact flash expansion slot coupled to a horizontal backplane in an industrial PC and in the alternative, having an externally accessible slot for receiving a compact flash expansion card therein.

7 Claims, 1 Drawing Sheet

METHOD AND SYSTEM FOR PROVIDING FLASH MEMORY IN AN INDUSTRIAL PERSONAL COMPUTER

FIELD OF THE INVENTION

The present invention generally relates to computers, and more particularly relates to personal computers, and even more particularly relates to methods and systems for providing memory in industrial personal computers.

BACKGROUND OF THE INVENTION

In recent years, industrial personal computers have become increasingly prevalent in many industries. It is not uncommon today to see rows of industrial PCs arranged in racks. Also in recent months, Compact Flash memory has gained widespread use in palm computers and in digital cameras, due to its non-volatile nature and its other price and performance characteristics. ATA flash, which includes a PCMCIA card having flash memory enclosed therein, has been used in the past. Additionally, it has been common to use PCMCIA cards with Compact Flash adapters therein to detachably receive Compact Flash memory devices and thereby allow coupling of Compact Flash devices with PCs, especially laptop computers. However, PCMCIA slots are typically much less prevalent in industrial PCs than in laptops. When PCMCIA slots are included in an industrial PC, it can, in some applications, occur by substituting a PCMCIA slot in a bay otherwise used for a floppy disk drive. Additionally, there have been expansion cards, which couple to the ISA or PCI expansion slots in a PC which have included slots therein for receiving a Compact Flash device. While the use of adapters and expansion cards to couple compact flash memory devices to a PC have been successfully used in the past, they do have some drawbacks. One drawback of such coupling methods is the requirement to use one of the available expansion slots or PCMCIA slots in the PC. Using such a slot reduces the overall versatility of the PC. Consequently, there exists a need for improved methods and systems for improving non-volatile memory in industrial computers.

SUMMARY OF THE INVENTION

It is an object of the present invention to provide a system and method for storing data in a non-volatile manner in industrial PCs.

It is a feature of the present invention to utilize a compact flash memory device disposed on the backplane of an industrial computer.

It is another feature of the present invention to include a slot for receiving compact flash devices.

It is an advantage of the present invention to achieve improved memory characteristic in industrial personal computers.

The present invention is an apparatus and method for improving memory performance in industrial personal computers, which are designed to satisfy the aforementioned needs, provide the previously stated objects, include the above-listed features and achieve the already articulated advantages. The present invention is carried out in a "PCMCIA-less" and "expansion card-less" manner in a sense that the need for the use of a PCMCIA or expansion card slot and adapter to receive compact flash devices has been greatly reduced.

Accordingly, the present invention is a system and method including a compact flash device coupled to a compact flash slot coupled directly to the backplane in an industrial computer; and, in the alternative, a compact flash device coupled to a slot for receiving an insert.

BRIEF DESCRIPTION OF THE DRAWINGS

The invention may be more fully understood by reading the following description of the preferred embodiments of the invention, in conjunction with the appended drawings wherein.

DETAILED DESCRIPTION

Figure 1:
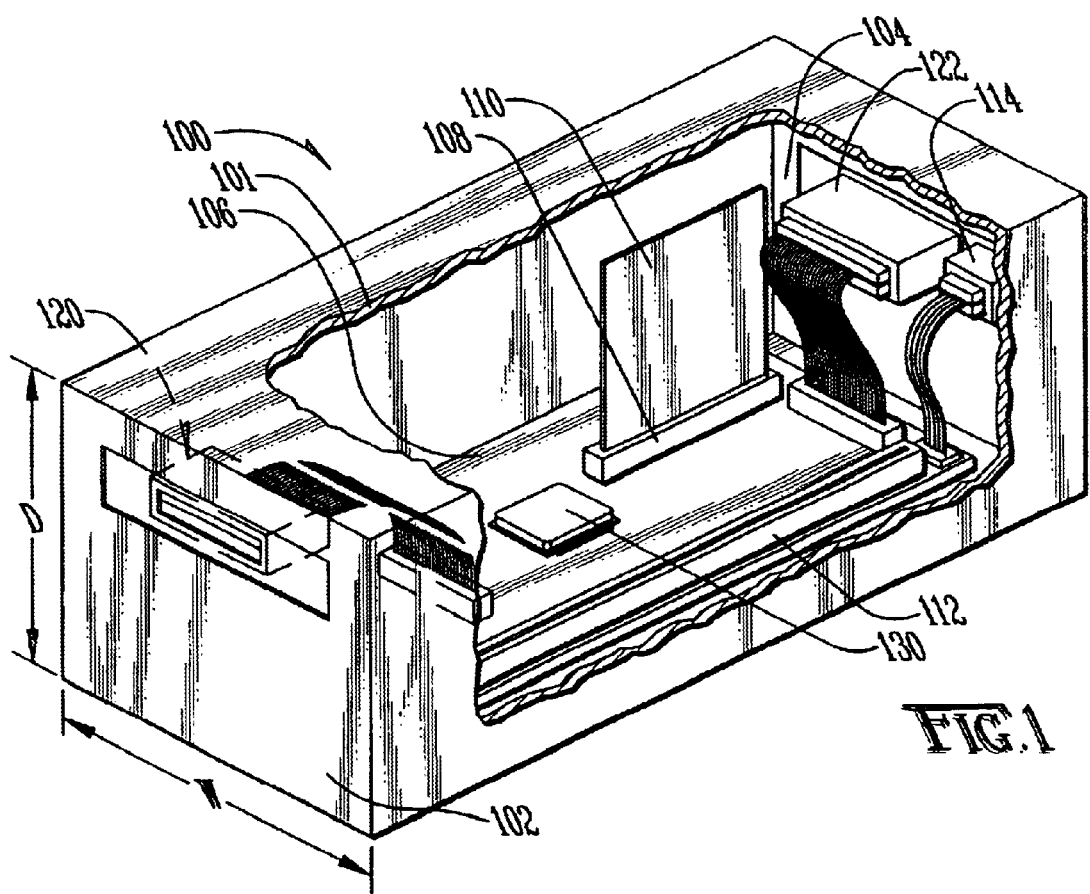
FIG. 1 is a perspective partially cut-away view of a system of the present invention.

Now referring to the drawings wherein like numerals refer to like matter throughout, and more specifically referring to FIG. 1, there is shown a partially cut-away view of an industrial PC of the present invention generally designated 100, where the jagged line 101 depicts the boundary of a cut-away region of the case of the PC 100, which is removed to reveal internal features. The PC 100 is shown including a face plate front end 102, a rear end 104 for insertion into a rack (not shown) having an empty slot therein. Faceplate front end 102 is shown having a width dimension w and a height dimension d. Throughout this description, the term "industrial PC" is used to represent a PC of the type which is capable of being stored in racks of multiple rows of PCs where each row has multiple PCs and where the PCs are coupled to wiring associated with the rack and other equipment by at least one connector at the rear end 104 of the PC 100. This definition of industrial PCs is not intended to include laptop PCs which have a connector on the rear end of the laptop for coupling with a docking station or a port replicator. Consequently, the term "industrial PC" will specifically exclude any computer where the width dimension w is greater than three times the height dimension d and shall not include any PC which has along its top side a hinged display screen hinged along the rear end of the PC.

PC 100 has a horizontal backplane 106 disposed along a bottom side of the PC 100. Backplane 106 includes a compact flash expansion slot 108 and a compact flash memory expansion card 110. Compact flash expansion slot 108 is intended to mean any slot or connector which is compliant with the industry standard CF+ types I or II slot, as defined by the compact flash CF+specification maintained by the Compact Flash Association of Palo Alto, Calif.

Compact flash memory expansion card 110 is intended to mean any expansion card, whether it is a memory card, disk drive, or any other device which is designed for use with and compliant with the industry standard CF+types I or II slot, as defined by the compact flash CF+specification maintained by the Compact Flash Association of Palo Alto, Calif. Examples of such expansion cards include memory cards (which are usable in various devices, such as Windows CE handheld computers, digital cameras, PCMCIA adapters for laptop computers, etc.)

The specification for CF+is published, generally available, and well-known prior art.

Also shown is front accessible slot 120, and rear accessible slot 122, which are slots for receiving and thereby coupling a compact flash memory expansion card 110 with the PC 100.

Backplane 106 is shown having a plurality of expansion slots 112 for receiving industry standard expansion cards, such as ISA or PCI cards, which are well known in the prior art. Backplane 106 is also shown having a CPU 130 thereon.

PC 100 is also shown having a mating connector 114 along the rear end 104. This connector may take many different forms, depending upon the type of rack with which the PC 100 is mated. Various connectors are well known in the art.

Throughout this description, reference is made to an industrial PC and to horizontal backplane, because it is believed that the beneficial aspects of the present invention would be most readily apparent when used in connection with industrial PCs and a horizontal backplane; however, it should be understood that the present invention is not intended to be limited to industrial PCs and horizontal backplanes and should be hereby construed to include other non-industrial PCs and non-horizontal backplanes as well.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

We claim:

1. An apparatus comprising:
   a PC having a planar member therein with planar expansion card slots thereon for receiving planar expansion cards therein; and,
   a compact flash expansion slot coupled to said planar member, so that a compact flash memory expansion card can be coupled to the PC without using one of the planar expansion card slots.

2. An apparatus of claim 1 wherein said PC is an industrial PC with a rear-mounted blind mating connector thereon for coupling with a rack.

3. An apparatus of claim 2 wherein said planar member is a horizontal backplane.

4. An apparatus of claim 3 wherein said planar expansion card slots are ISA slots.

5. An apparatus of claim 3 wherein said planar expansion card slots are PCI slots.

6. An apparatus of claim 3 wherein said compact flash expansion slot comprises a means for receiving a compact flash expansion memory card in a vertical configuration so as to be orthogonal with respect to said planar member.

7. An apparatus of claim 6 wherein said backplane has a central processing unit disposed thereon.

\* \* \* \* \*